United States Patent [19]
Ogura et al.

[11] Patent Number: 5,677,542
[45] Date of Patent: Oct. 14, 1997

[54] RADIATION IMAGE READ-OUT SYSTEM

[75] Inventors: Nobuhiko Ogura; Yasushi Kojima, both of Kanagawa-ken, Japan

[73] Assignee: Fuji Photo Film Co. Ltd., Kanagawa, Japan

[21] Appl. No.: 486,587

[22] Filed: Jun. 7, 1995

[30] Foreign Application Priority Data

Jul. 15, 1994 [JP] Japan ............ 6-163588

[51] Int. Cl.$^6$ ............ G03D 42/02
[52] U.S. Cl. ............ 250/585
[58] Field of Search ............ 250/585

[56] References Cited

U.S. PATENT DOCUMENTS

| | | |
|---|---|---|
| 4,651,220 | 3/1987 | Hosoi et al. . |
| 4,851,676 | 7/1989 | Mori et al. ............ 250/583 |
| 4,870,667 | 9/1989 | Brunnett et al. ............ 378/19 |
| 4,889,990 | 12/1989 | Hosoi et al. . |

FOREIGN PATENT DOCUMENTS

| | | |
|---|---|---|
| 61-121250 | 6/1986 | Japan . |
| 61-121251 | 6/1986 | Japan . |
| 1-207737 | 8/1989 | Japan . |
| 2-287200 | 11/1990 | Japan . |

*Primary Examiner*—Constantine Hannaher
*Attorney, Agent, or Firm*—Sughrue, Mion, Zinn, Macpeak & Seas, PLLC

[57] ABSTRACT

A stimulable phosphor sheet, on which a radiation image has been stored, is scanned with stimulating rays at predetermined read-out pitches in a main scanning direction and in a sub-scanning direction. Light emitted by the stimulable phosphor sheet exposed to the stimulating rays is photoelectrically detected, and an image representing the radiation image is thereby obtained. The read-out pitch in the sub-scanning direction is set at a value falling within the range of approximately 20 μm to approximately 30 μm. A quick read-out device is provided which sets the read-out pitch in the main scanning direction at a value, that falls within the range of approximately 20 μm to approximately 30 μm, in accordance with the read-out pitch in the sub-scanning direction. The stimulable phosphor sheet is provided with a transparent protective layer having a thickness of at most 5 μm and a stimulable phosphor layer having a thickness falling within the range of 10 μm to 150 μm and is colored with a coloring agent. The coloring agent is a blue inorganic pigment having an average particle diameter falling within the range of 0.01 μm to 0.9 μm.

5 Claims, 5 Drawing Sheets

F I G. 1
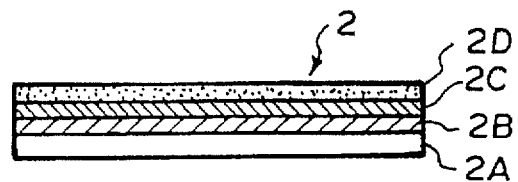
F I G. 2
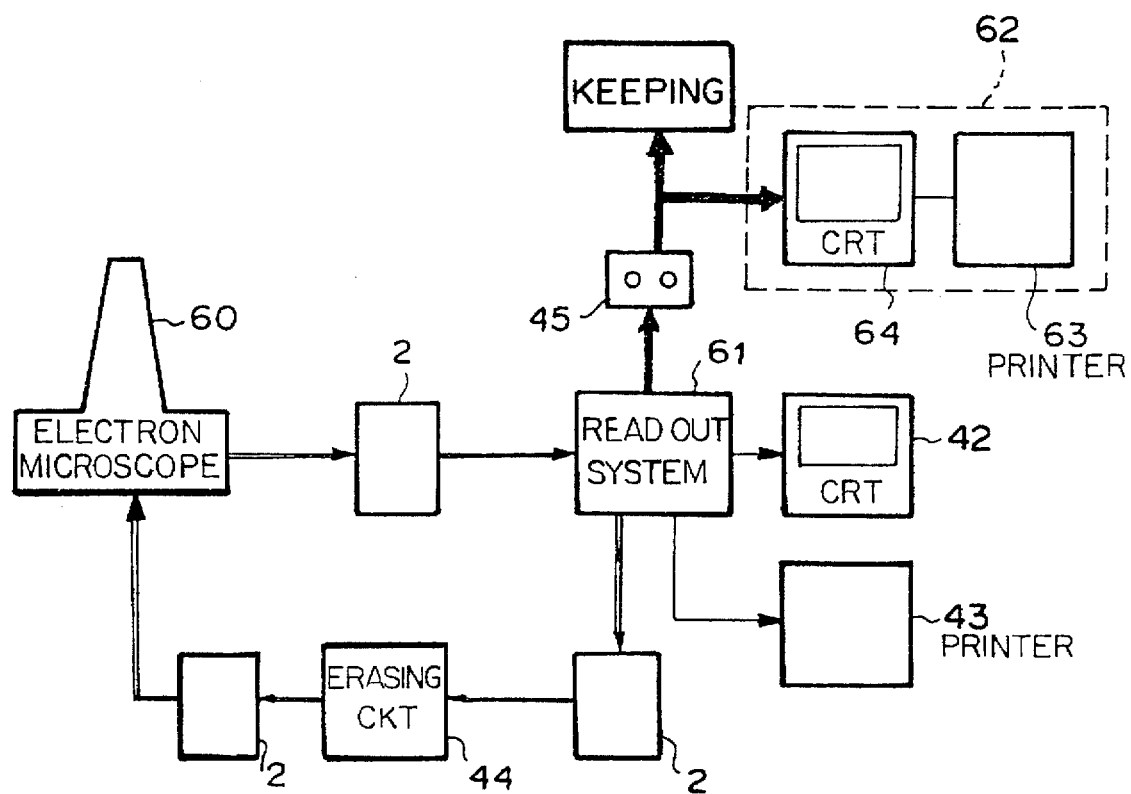

RADIATION IMAGE READ-OUT SYSTEM

BACKGROUND OF THE INVENTION

1. Field of the Invention

This invention relates to a radiation image read-out system for scanning a stimulable phosphor sheet, on which a radiation image has been stored, with stimulating rays. The rays cause the stimulable phosphor sheet to emit light in proportion to the amount of energy stored thereon during its exposure to radiation, thereby reading out the radiation image. This invention particularly relates to a radiation image read-out system with which a radiation image is capable of being read out with a high resolution.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

Stimulable phosphor sheets are used as a means for recording radiation images mainly in the field of medicine, but they may be used in various other fields as well. For example, in U.S. Pat. Nos. 4,651,220 and 4,889,990, the inventors proposed novel methods for recording and reproducing an electron microscope image wherein a stimulable phosphor sheet is utilized. Basically, the proposed methods for recording and reproducing an electron microscope image comprise the steps of (i) exposing a stimulable phosphor sheet, which is capable of storing electron beam energy thereon, to an electron beam which has passed through a sample in a vacuum in order to store the electron beam energy on the stimulable phosphor sheet, (ii) thereafter exposing the stimulable phosphor sheet to, for example, stimulating rays which cause it to release the stored energy as emitted light, (iii) photoelectrically detecting the emitted light to obtain an image signal, and (iv) using the image signal during the reproduction of an electron microscope image of the sample.

In order to obtain an image, which has good image quality and can serve as an effective tool in, particularly, the efficient and accurate analysis of the sample, it is desirable that a read-out apparatus, which is used in the electron microscope image recording and reproducing method, and in which the stimulable phosphor sheet is exposed to stimulating rays and the light emitted by the stimulable phosphor sheet is detected, be capable of reading out the recorded image at a higher resolution than the resolution, at which the read-out apparatus for the aforesaid system for recording and reproducing the radiation image of a human body, or the like, reads out a recorded image.

The inventors carried out experiments for investigating the change in the resolution of an image reproduced from an image signal, which has been obtained from the image read-out operation, when the beam diameter of the stimulating ray beam, with which the stimulable phosphor sheet is scanned, and the read-out pitch are set at various different values. As a result, it was found that the resolution of the image deteriorates markedly when the diameter of the stimulating ray beam and the read-out pitch are not smaller than 100 μm.

In the aforesaid system for recording and reproducing a radiation image of a human body, or the like, the diameter of the stimulating ray beam and the read-out pitch have heretofore been adjusted to be not smaller than 100 μm. For example, they have been set at 150 μm or 200 μm. When the operation for reading out the radiation image is carried out under such conditions, the resolution of the reproduced radiation image is substantially suitable for the viewing purposes, particularly for diagnosis of a human body, or the like. However, an electron microscope image naturally has a very high resolution. Therefore, in the case where an electron microscope image is stored on the stimulable phosphor sheet, then read out from the stimulable phosphor sheet and reproduced into a visible image, the resolution of the reproduced image can be improved markedly, and the image quality of the image and its capability of serving as an effective tool in, particularly, the efficient and accurate analysis of the sample can be improved by adjusting the diameter of the stimulating ray beam and the read-out pitch to be smaller than 100 μm.

Therefore, in Japanese Unexamined Patent Publication No. 1(1989)-207737, the inventors proposed a radiation image read-out system, wherein the read-out pitch, at which a radiation image is read out from a stimulable phosphor sheet, is adjusted to be smaller than 100 μm. With the proposed radiation image read-out system, both the diameter of a stimulating ray beam and the read-out pitch are set to be smaller than 100 μm, and the resolution of a reproduced image is thereby kept high.

An image signal, which has been obtained from an image read-out operation, is often subjected to a frequency analysis utilizing a fast Fourier transform device (an FFT device). A structure of a frequency band to be used is extracted from the image and analyzed.

In the field of the reproduction of an electron microscope image, in the field of cerebral autoradiography, or the like, it is desired that images be read out at a higher resolution. However, even though the resolution can be kept high during the image read-out operation, if the resolution of a stimulable phosphor sheet, on which an image is to be stored, is low, a reproduced image having a high resolution cannot be obtained. In such cases, even if the image is read out by setting the read-out pitch to be small, a reproduced image having a high resolution cannot be obtained. Also, even if the structure analysis described above is carried out on the image having a low resolution, good analysis results cannot be obtained.

SUMMARY OF THE INVENTION

The primary object of the present invention is to provide a radiation image read-out system, wherein an image is capable of being read out at a high resolution.

Another object of the present invention is to provide a radiation image processing apparatus, wherein an analysis is capable of being carried out with a frequency image having a high resolution.

The present invention provides a radiation image read-out system for scanning a stimulable phosphor sheet, on which a radiation image has been stored, with stimulating rays, which cause the stimulable phosphor sheet to emit light in proportion to the amount of energy stored thereon during its exposure to radiation, at predetermined read-out pitches in a main scanning direction and in a sub-scanning direction, and photoelectrically detecting the emitted light, an image representing the radiation image being thereby obtained, wherein the read-out pitch in the sub-scanning direction is set at a value falling within the range of approximately 20 μm to approximately 30 μm, a quick read-out means is provided which sets the read-out pitch in the main scanning direction during the operation for obtaining the image signal at a value, that falls within the range of approximately 20 μm to approximately 30 μm, in accordance with the read-out pitch in the sub-scanning direction, and the stimulable phosphor sheet is provided with a transparent protective layer having a thickness of at most 5 μm and a stimulable phosphor layer having a thickness falling within the range of 10 μm to 150 μm and is colored with a coloring agent, and the coloring agent is a blue inorganic pigment having an average particle diameter falling within the range of 0.01 μm to 0.9 μm.

The present invention also provides a radiation image processing apparatus comprising:

i) a Fourier transform means for carrying out a fast Fourier transform on an image signal, which has been obtained from a radiation image read-out system as described above, ii) an extraction means for extracting only an image signal of a desired frequency band from the image signal, which has been obtained from the fast Fourier transform carried out by the Fourier transform means, iii) an inverse Fourier transform means for carrying out an inverse Fourier transform on the image signal, which has been extracted by the extraction means, and iv) an image reproducing means for reproducing a visible image from the image signal, which has been obtained from the inverse Fourier transform carried out by the inverse Fourier transform means.

With the radiation image read-out system in accordance with the present invention, the read-out pitch is set at a value, which falls within the range of approximately 20 μm to approximately 30 μm and which is markedly smaller than the read-out pitch conventionally employed. Also, a stimulable phosphor sheet is employed which has a resolution that can cope with the resolution obtained with the set read-out pitch. Therefore, an image can be read out at a high resolution. Accordingly, the radiation image read-out system in accordance with the present invention can be used very appropriately as a system for reading out an electron microscope image, a cerebral autoradiography image, or the like.

With the radiation image processing apparatus in accordance with the present invention, the fast Fourier transform is carried out by the Fourier transform means on the image signal, which represents a radiation image and which has been obtained from the radiation image read-out system in accordance with the present invention. In this manner, the image signal is transformed into signals, each of which is of one of a plurality of different frequency bands. Thereafter, only an image signal of a desired frequency band is extracted by the extraction means from the signals, each of which is of one of a plurality of different frequency bands. In the inverse Fourier transform means, the inverse Fourier transform is carried out on the signal, which has been extracted by the extraction means. Therefore, the signal, which has been obtained from the inverse Fourier transform, represents an image of only the desired frequency band. A visible image is then reproduced by the image reproducing means from the signal, which has been obtained from the inverse Fourier transform. In this manner, the image of only the desired frequency band is reproduced as the visible image. Further, the image reproduced by the image reproducing means is the image having a high resolution, which is obtained with the radiation image read-out system in accordance with the present invention. Therefore, the image of only the desired frequency band can be reproduced at a high resolution. Accordingly, the frequency analysis can be carried out with the image having a high resolution.

BRIEF DESCRIPTION OF THE DRAWINGS

FIG. 1 is a sectional view showing a stimulable phosphor sheet, which is employed in an embodiment of the radiation image read-out system in accordance with the present invention, FIG. 2 is a block diagram showing a radiation image recording and reproducing system, in which an embodiment of the radiation image read-out system in accordance with the present invention is employed.

DESCRIPTION OF THE PREFERRED EMBODIMENTS

Figure 3:
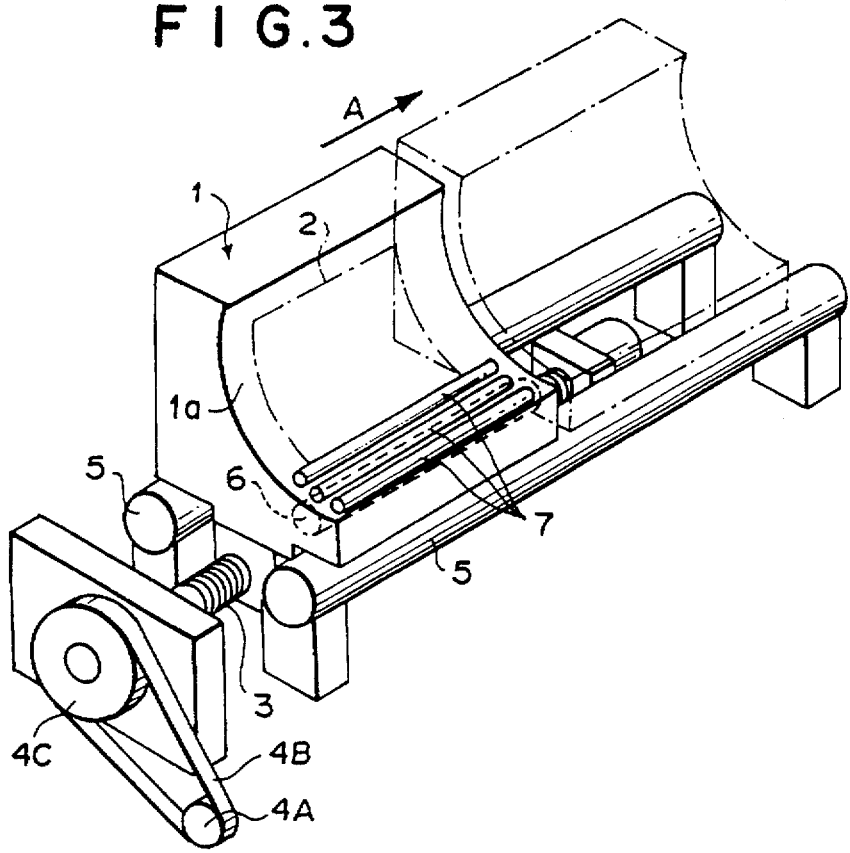
FIG. 3 is a perspective view showing a sheet holding means and a sub-scanning means in an embodiment of the radiation image read-out system in accordance with the present invention.

The present invention will hereinbelow be described in further detail with reference to the accompanying drawings.

FIG. 1 is a sectional view showing a stimulable phosphor sheet, which is employed in an embodiment of the radiation image read-out system in accordance with the present invention. As illustrated in FIG. 1, a stimulable phosphor sheet 2 comprises a substrate 2A, an under coating layer 2B, a stimulable phosphor layer 2C, and a protective layer 2D. The under coating layer 2B, the stimulable phosphor layer 2C, and the protective layer 2D are overlaid in this order on the substrate 2A. In this embodiment, the under coating layer 2B, the stimulable phosphor layer 2C, and the protective layer 2D were formed in the manner described below.

Under coating layer:

A dispersion for forming a reflecting material layer (viscosity: 10P at 20° C.) was prepared by dispersing 30 g of a binder (a soft acrylic resin, Criscoat P-1018GS: 20% solution, supplied by Dainippon Ink and Chemicals, Inc.), 3.5 g of a phthalic ester, and 10 g of an electrically conductive whisker (Dentall BK-200 supplied by Otsuka Chemical Co., Ltd.) in methyl ethyl ketone by use of a propeller mixer. The resulting dispersion was uniformly applied onto a polyethylene terephthalate sheet by using a doctor blade. The film thus formed was then dried. In this manner, a reflecting material layer having a thickness of 20 μm was formed.

Stimulable phosphor layer:

In order to prepare a coating composition for forming a stimulable phosphor sheet, 200 g of a stimulable phosphor ($BaFBr_{0.8}I_{0.2}:Eu^{2+}$), 7 g of a binder [a polyurethane elastomer, T-5265H (solid) supplied by Dainippon Ink and Chemicals, Inc. ], 1.6 g of a coloring agent (ultramarine blue), and 1.4 g of a yellowing preventing agent [an epoxy resin, EP1004 (solid) supplied by Yuka Shell Epoxy K.K.] were added to methyl ethyl ketone and dispersed therein with a propeller mixer. In this manner, a coating composition having a viscosity of 30P (at 25° C.) was prepared (binder:phosphor ratio=1:20). The coating composition was applied onto a polyethylene terephthalate sheet, on which a silicon-based release agent had been coated and which served as a temporary substrate (thickness: 180 μm). The applied layer of the coating composition was then dried and separated from the temporary substrate. In this manner, a stimulable phosphor layer (thickness: 150 μm) was formed.

Protective layer:

A coating composition having a viscosity falling within the range of 0.2P to 0.3P was prepared by adding 50 g of a fluorine-based resin (a fluoroolefin-vinyl ether copolymer, Lumiflon LF504X: 40% solution, supplied by Asahi Glass Co., Ltd.) and 9 g of a crosslinking agent (isocyanate, Olester NP38-70S: 70% solution, supplied by Mitsui Toatsu Chemicals, Inc.) to a methyl ethyl ketone-cyclohexanone (2:8) mixed solvent. The resulting coating composition was applied onto the stimulable phosphor layer, which had been formed in the manner described above, by using a doctor blade. Thereafter, the applied coating composition was subjected to heat treatment at 120° C. for 30 minutes. The applied coating composition was thus thermally cured and dried. In this manner, a protective layer having a thickness of 3 μm was formed.

The stimulable phosphor layer and the substrate provided with the under coating layer were superposed one upon the other and continuously pressed by using calender rolls under the conditions of a pressure of 500 kgw/cm$^2$, an upper roll temperature of 75° C., a lower roll temperature of 75° C., and a feed rate of 1.0 m/minute. With the heat pressing operation, the stimulable phosphor layer was perfectly fused to the substrate via the under coating layer. At this time, the thickness of the stimulable phosphor layer was 110 μm. The protective layer described above was formed on the stimulable phosphor layer. The stimulable phosphor layer, the coloring agent, and the protective layer are described respectively in Japanese Unexamined Patent Publication Nos. 61(1986)-121251, 61(1986)-121250, and 2(1990)-287200.

The stimulable phosphor employed in the present invention is not limited to the stimulable phosphor described above and may be selected from various other phosphors, which are capable of emitting light after being exposed to radiation and thereafter exposed to stimulating rays. Also, the material of the binder, in which the stimulable phosphor is dispersed, and the material of the protective layer are not limited to those described above. Instead of the binder being contained, the stimulable phosphor layer may be constituted of only an aggregate of a stimulable phosphor. Alternatively, a polymer substance may be contained in interstices in an aggregate of a stimulable phosphor. The process for forming the stimulable phosphor sheet is not limited to the aforesaid process, in which the stimulable phosphor layer is separated from the temporary substrate and fused to the substrate with the heat pressing operation. For example, the stimulable phosphor layer and the substrate may be adhered to each other by using an adhesive agent. Alternatively, the coating composition for forming a stimulable phosphor sheet may be directly applied onto the substrate.

The stimulable phosphor sheet 2 is prepared in the manner described above. Thereafter, an electron microscope image of a sample is stored on the stimulable phosphor sheet 2 by using an electron microscope. The stimulable phosphor sheet 2, on which the electron microscope image has been stored, is fed into the radiation image read-out system in accordance with the present invention, and an image signal representing the electron microscope image of the sample is obtained from the stimulable phosphor sheet 2.

FIG. 2 is a block diagram showing a radiation image recording and reproducing system, in which an embodiment of the radiation image read-out system in accordance with the present invention is employed. In FIG. 2, the arrow indicated by a thin solid line represents the flow of the signal, the arrow indicated by a double line represents the flow of the stimulable phosphor sheet, and the arrow indicated by a thick solid line represents the flow of a digital audio tape (hereinafter referred to as DAT). In the radiation image recording and reproducing system illustrated in FIG. 2, an electron microscope image is stored on a stimulable phosphor sheet 2 in an electron microscope 60. The stimulable phosphor sheet 2, on which the electron microscope image has been stored, is fed into a radiation image read-out system 61 in accordance with the present invention. With the radiation image read-out system 61, the electron microscope image is read out from the stimulable phosphor sheet 2 in the manner which will be described later, and an image signal representing the electron microscope image is thereby obtained. The image signal is fed into a cathode ray tube display device (CRT display device) 42 and used for the reproduction of a visible image. Alternatively, the image signal may be fed into a printer 43 and reproduced as a hard copy. As another alternative, the image signal may be stored on a DAT 45.

The DAT 45, on which the image signal has been stored, is fed into an image processing means 62, and image processing is carried out on the image signal. Specifically, in the image processing means 62, the image signal is read from the DAT 45 and displayed as an image on a CRT display device 64. Desired image processing is carried out on the image signal with reference to the displayed image. An image is then reproduced as a hard copy with a printer 63 from the image signal, which has been obtained from the image processing. The DAT 45, on which the image signal has been stored, may be kept as such. Alternatively, the image signal may be read from the DAT 45 and transmitted to the other systems. As another alternative, the image signal, which has been obtained from the image processing carried out by the image processing means 62, may be transmitted to the other systems.

Retrieval information for each of image signals may be stored on the DAT 45, and the image signals stored on the DAT 45 may be retrieved with reference to the retrieval information. In cases where the retrieval information is stored on the DAT 45, the image signal stored on the DAT 45 can be retrieved quickly.

After the image signal has been detected from the stimulable phosphor sheet 2 in the manner, which will be described later, the stimulable phosphor sheet 2 is fed into an erasing means 44. In the erasing means 44, energy remaining on the stimulable phosphor sheet 2 is released. The erased stimulable phosphor sheet 2 is then used again to record an electron microscope image with the electron microscope 60.

How a radiation image read-out apparatus, which may be employed in an embodiment of the radiation image read-out system in accordance with the present invention, is constructed will be described hereinbelow.

FIG. 3 is a perspective view showing a sheet holding means and a sub-scanning means in an embodiment of the radiation image read-out system in accordance with the present invention. With reference to FIG. 3, a platen 1 serving as a sheet holding means has a concave cylindrical surface 1a. A drive roller 6 and driven rollers 7, 7, 7 are located close to the lower edge portion of the cylindrical surface 1a. A stimulable phosphor sheet 2 carries a radiation image (an electron microscope image) stored thereon by, for example, being exposed to an electron beam, which has passed through a sample in an electron microscope. The stimulable phosphor sheet 2 is conveyed by a known sheet conveyance means (not shown), and the leading edge of the stimulable phosphor sheet 2 is fed to the lower part of the platen 1. Then, the drive roller 6 is rotated in order to feed the stimulable phosphor sheet 2 to a predetermined position along the cylindrical surface 1a.

In this manner, the stimulable phosphor sheet 2 is held as indicated by the chained line in FIG. 3 on the platen 1. The lower part of the platen 1 is engaged with a screw rod 3. The screw rod 3 is engaged with a driven pulley 4C. The driven pulley 4C is coupled by a transmission belt 4B with a motor 4A, which serves as a drive pulley. The driven pulley 4C, the transmission belt 4B, and the motor 4A constitute a mechanism for moving the platen 1. The motor 4A rotates the driven pulley 4C, and the screw rod 3 is thereby rotated. In this manner, the platen 1 can be moved at a predetermined speed and in the direction indicated by the arrow A along two guide rails 5, 5. The platen 1 is thus moved between the position indicated by the solid lines in FIG. 3 and the position indicated by the chained lines. In this embodiment, the sub-scanning means is constituted of the screw rod 3, the motor 4A, the transmission belt 4B, the driven pulley 4C, and the guide rails 5, 5. In this embodiment, the read-out pitch is 25 μm.

Figure 4:
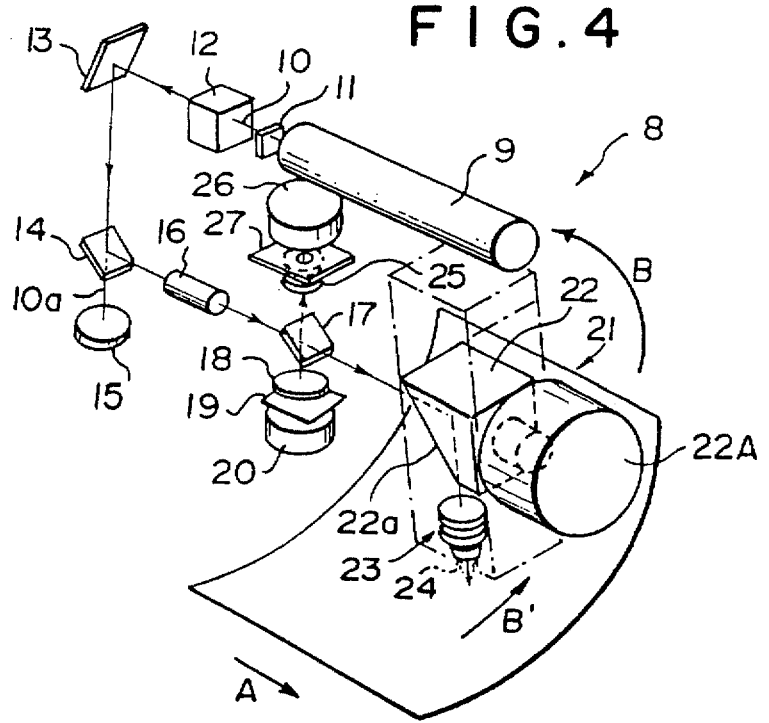
FIG. 4 is a perspective view showing a scanning optical system in the embodiment of FIG. 3.
Figure 5:
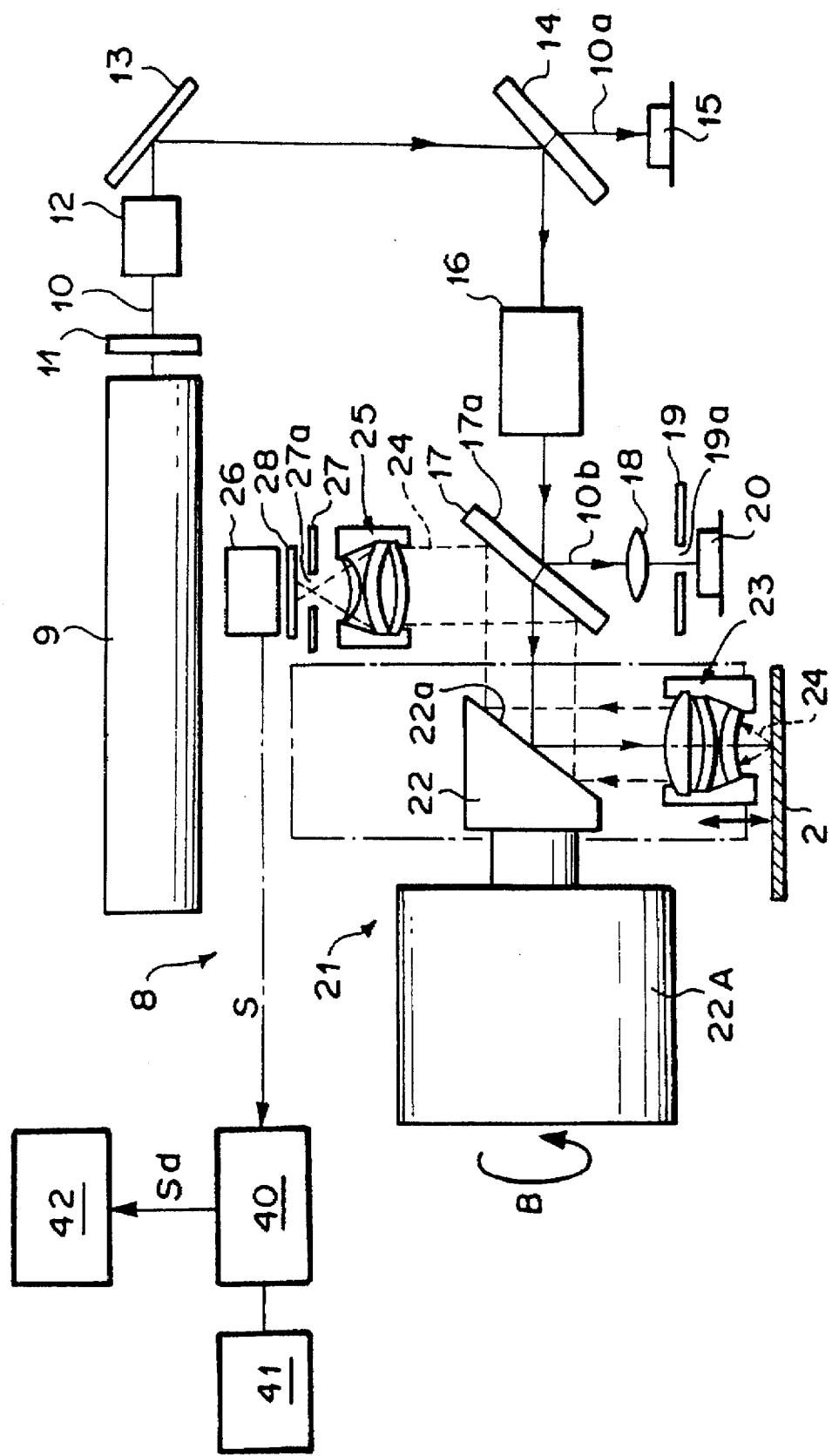
FIG. 5 is a front view showing the scanning optical system in the embodiment of FIG. 3.

A scanning optical system 8 having the structure shown in FIGS. 4 and 5 is located above the platen 1. The image stored on the stimulable phosphor sheet 2 is read out by the scanning optical system 8. In the scanning optical system 8, a laser beam 10 serving as stimulating rays is produced by a He-Ne laser 9, which is a source for the stimulating rays. The laser beam 10 is passed through a filter 11 for filtering out light of unnecessary wavelengths and is then passed through an acousto-optic modulator (AOM) 12 for adjusting the intensity of the laser beam 10. Thereafter, the laser beam 10 is reflected by mirrors 13 and 14, and the direction of the optical path of the laser beam 10 is thereby changed. The mirror 14 transmits a predetermined small portion of the incident laser beam 10 as indicated by 10a. The intensity of the laser beam 10a, which has passed through the mirror 14, is detected by a photodetector 15. The photodetector 15 controls the AOM 12 in accordance with the detected intensity of the laser beam 10a so that the intensity of the laser beam 10 radiated by the AOM 12 may be kept constant.

The portion of the laser beam 10, which has been reflected by the mirror 14, is passed through a beam expander 16, which expands the beam diameter of the laser beam 10 to a predetermined value. Thereafter, the laser beam 10 impinges upon a dichroic mirror 17. The dichroic mirror 17 transmits light having wavelengths within the range of wavelengths of the laser beam 10 and reflects light having wavelengths within the range of wavelengths of the light, which is emitted by the stimulable phosphor sheet 2 when the stimulable phosphor sheet 2 is exposed to the laser beam 10. The dichroic mirror 17 has a laser beam input face 17a, which has been subjected to surface treatment such that it may reflect a very small portion of the incident laser beam 10 as indicated by 10b. The laser beam 10b, which has been reflected by the laser beam input face 17a, is converged by a converging lens 18, passes through an aperture 19a of an aperture plate 19, and is then detected by a photodetector 20. The photodetector 20 detects the position of incidence of the laser beam 10b and determines whether the optical axis of the laser beam 10 has or has not a predetermined direction. The photodetector 20 thus generates a signal for fine adjustment of the angles of the mirrors 13 and 14 in accordance with the position of incidence of the laser beam 10b.

The laser beam 10, which has passed through the dichroic mirror 17, impinges upon a spinner 21, which is located in the optical path of the laser beam 10. The laser beam 10 is thus reflected and deflected by the spinner 21. The spinner 21 is provided with a spindle motor 22A, which continuously and quickly rotates a deflection mirror 22 in the direction indicated by the arrow B. The deflection mirror 22 has a reflection surface 22a, which is inclined at an angle of 45° with respect to the incident laser beam 10. The deflection mirror 22 is located such that it may reflect the laser beam 10 on the center axis of the cylindrical surface 1a of the platen 1. The length of the optical path of the laser beam 10 between the position, at which the laser beam 10 is reflected by the deflection mirror 22, and the position, at which the laser beam 10 impinges upon the stimulable phosphor sheet 2, is kept constant.

A condensing lens 23 for converging the laser beam 10, which is incident as a collimated light beam, to a spot having a diameter of, for example, 25 μm, on the stimulable phosphor sheet 2 is located in the optical path of the laser beam 10, which has been reflected and deflected by the deflection mirror 22. The condensing lens 23 constitutes part of the spinner 21 and is rotated together with the deflection mirror 22. The laser beam 10 is reflected and deflected by the spinner 21 and is thereby caused to scan the stimulable phosphor sheet 2 repeatedly in the main scanning direction, which is indicated by the arrow B' in FIG. 4. At the same time, as described above, the platen 1 is moved at a predetermined speed in the sub-scanning direction indicated by the arrow A. Therefore, the stimulable phosphor sheet 2 is two-dimensionally scanned with the laser beam 10.

The condensing lens 23 can be located close to the stimulable phosphor sheet 2 without its diameter being increased. Therefore, a lens having a short focal length can be used as the condensing lens 23 such that the laser beam 10 can be converged to a very small spot diameter, and the operation for reading out the radiation image from the stimulable phosphor sheet 2 can be carried out at a high resolution.

When the stimulable phosphor sheet 2 is exposed to the laser beam 10, the exposed portion of the stimulable phosphor sheet 2 emits light 24 in an amount proportional to the amount of energy stored on said portion during its exposure to radiation. The light 24 is emitted as non-directional light by the exposed portion of the stimulable phosphor sheet 2. The emitted light 24 is collimated by the condensing lens 23, which is spaced by a distance equal to the focal length f from the exposed portion of the stimulable phosphor sheet 2. The emitted light 24, which has thus been collimated, is reflected by the deflection mirror 22 of the spinner 21 and then reflected by the dichroic mirror 17. A detection lens 25 for converging the emitted light 24 is located in the optical path of the emitted light 24, which has been reflected by the dichroic mirror 17. The emitted light 24 is converged by the detection lens 25 and then impinges upon a photomultiplier 26.

An aperture plate 27 is located at the position of convergence of the emitted light 24 by the detection lens 25. The aperture plate 27 has an aperture 27a of a size that allows only the emitted light 24 carrying the image information to pass therethrough. Specifically, part of the laser beam 10 impinging upon the stimulable phosphor sheet 2 may be reflected by the sheet surface, and the reflected laser beam may impinge upon members in the apparatus, such as the condensing lens 23. The laser beam may then be reflected by these members back to the stimulable phosphor sheet 2 but not to the predetermined position of laser beam irradiation. In such cases, light is undesirably emitted by portions of the sheet stimulated when the laser beam is reflected back to the sheet. However, the light thus emitted by the sheet portions passes through the condensing lens 23, the detection lens 25, and the like, and is guided to positions different from the position, to which the light 24 emitted by the predetermined position on the stimulable phosphor sheet 2 is guided. Therefore, the light thus emitted by the sheet portions is intercepted by the aperture plate 27, and is prevented from impinging upon the photomultiplier 26.

In this manner, with the embodiment wherein the aperture plate 27 is provided, the light, which is emitted by the stimulable phosphor sheet 2 when it is exposed to reflected stimulating rays and stimulating rays scattered in the stimulable phosphor sheet 2, can be cut off, and the image read-out operation can be carried out accurately.

The laser beam 10, which has been reflected by the stimulable phosphor sheet 2 and has passed through the condensing lens 23, will often pass through the aperture 27a of the aperture plate 27 together with the light 24 emitted by the stimulable phosphor sheet 2. In order to eliminate this problem, a filter 28 for selectively transmitting only light having a wavelength within the wavelength range of the emitted light 24 is provided on the light receiving face of the photomultiplier 26. The filter 28 filters out the laser beam 10, which has passed through the aperture 27a. The photomultiplier 26 photoelectrically detects the emitted light 24 and generates a signal S. The signal S is integrated for a predetermined time, sampled, and divided into picture elements by an image read-out circuit 40.

A high-speed amplifier 41 is connected to the image read-out circuit 40. The high-speed amplifier 41 quickly carries out the sampling process at short sampling intervals. Therefore, the high-speed amplifier 41 can be set such that the sampling process may be carried out at a speed two times as high as the speed of a conventional apparatus. In this manner, in cases where the sampling intervals have heretofore been 50 µm, the sampling intervals can be set at 25 µm in this embodiment. The read-out image signal Sd, which has been obtained from the processing, is fed into, for example, the CRT display device 42, and the electron microscope image is reproduced as a visible image from the read-out image signal Sd. As illustrated in FIG. 2, instead of the electron microscope image being displayed on the CRT display device 42, the electron microscope image may be reproduced as a hard copy by the printer 43.

By the time the image read-out operation is finished, the platen 1 has moved to the position indicated by the chained line in FIG. 3, and stops at this position. Thereafter, the direction of rotation of the roller 6 is reversed, and the stimulable phosphor sheet 2 is moved from the platen 1 to a sheet conveyance system (not shown).

A feature of the present invention is that the spot diameter of the laser beam 10 on the stimulable phosphor sheet 2 is adjusted to be less than 25 µm. Also, the sub-scanning pitch is adjusted to be 25 µm. Further, the read-out pitch in the main scanning direction is adjusted to be 25 µm by adjusting the sampling period of the signal S to be an appropriate value. Because the spot diameter of the laser beam 10 and the read-out pitch can be adjusted to approximately 25 µm, the resolution of the electron microscope image reproduced by the CRT display device 42 or the printer 43 can be kept sufficiently high. Such effects will be described hereinbelow.

Figure 6:
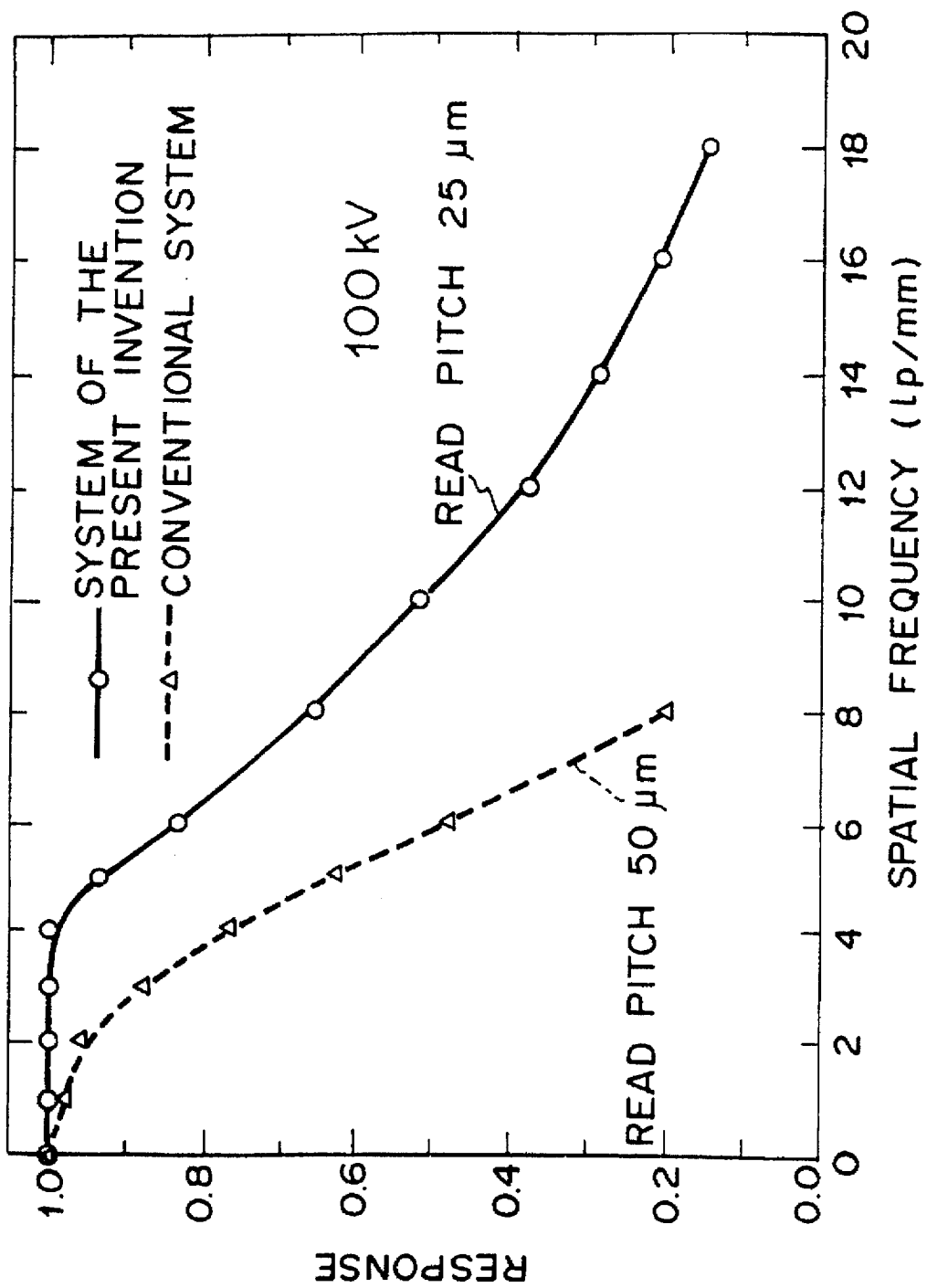
FIG. 6 is a graph showing spatial frequency responses of the radiation image read-out system in accordance with the present invention and a conventional radiation image read-out system.

FIG. 6 is a graph showing spatial frequency responses of the radiation image read-out system in accordance with the present invention and a conventional radiation image read-out system. The spatial frequency responses were investigated by using a 100 kV electron beam and a metal chart. As illustrated in FIG. 6, the spatial frequency responses with the radiation image read-out system in accordance with the present invention are markedly higher than the spatial frequency responses with the conventional radiation image read-out system, wherein the read-out pitch is 50 µm.

In the present invention, the beam diameter of the stimulating rays and the read-out pitch are not limited to the values described above and may be set at any of values falling within the range of 20 µm to 30 µm.

Figure 7:
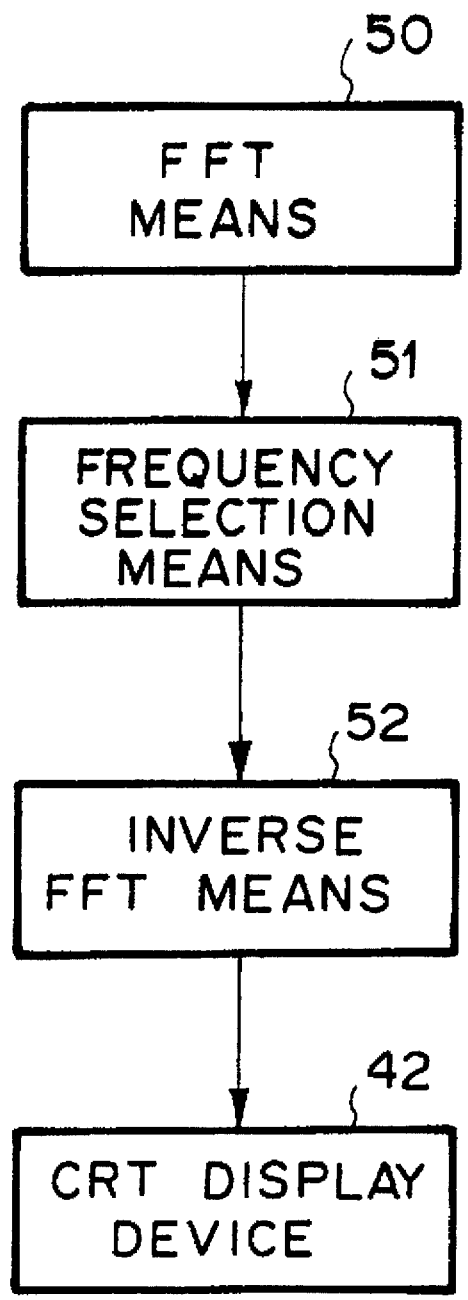
FIG. 7 is a block diagram showing an embodiment of the radiation image processing apparatus in accordance with the present invention.

In the embodiment described above, the read-out image signal Sd is immediately used for the reproduction of a visible image by the CRT display device 42 shown in FIG. 5, or the like. Alternatively, image processing may be carried out on the image signal Sd before the image signal Sd is used for the reproduction of a visible image. Specifically, only the structure of a frequency band to be used and analyzed may be extracted from the electron microscope image. In such cases, as illustrated in FIG. 7, the read-out image signal Sd may be fed into a fast Fourier transform means (FFT means) 50 and subjected to a fast Fourier transform. The image signal, which has been obtained from the fast Fourier transform, is fed into a CRT display device, or the like, and used for the reproduction of a visible image. In a frequency selection means 51, a desired frequency is selected with reference to the visible image displayed on the CRT display device. Thereafter, in an inverse FFT means 52, an inverse Fourier transform is carried out on the image signal of the selected frequency. The image signal, which has been obtained from the inverse Fourier transform, is fed into an image reproducing means, such as the CRT display device 42, and used for the reproduction of a visible image.

The image, which is reproduced by the CRT display device 42, or the like, is the image having a high resolution, which is obtained with the radiation image read-out system in accordance with the present invention. Therefore, with the radiation image processing apparatus in accordance with the present invention, the image of only the desired frequency band can be reproduced at a high resolution. Accordingly, the frequency analysis can be carried out with the image having a high resolution.

What is claimed is:

1. A radiation image read-out system for scanning a stimulable phosphor sheet, on which a radiation image has been stored, with stimulating rays, wherein said stimulating rays cause the stimulable phosphor sheet to emit light in proportion to the amount of energy stored thereon during its exposure to radiation at predetermined read-out pitches in a main scanning direction and in a sub-scanning direction to photoelectrically detect the emitted light to obtain an image representing the radiation image said system comprising:

a sub-scanning read-out means for setting the read-out pitch in the sub-scanning direction of said stimulable phosphor sheet wherein the sub-scanning read-out pitch is set to a value within the range of approximately 20 µm to approximately 30 µm; and a read-out means for setting a read-out spot diameter of said stimulating rays, wherein the read-out spot diameter is set to a value within the range of approximately 20 μm to approximately 30 μm, in accordance with the read-out pitch in the sub-scanning direction, to read out information in the stimulable phosphor sheet; and a high speed sampling means for sampling an image signal which has been obtained from the radiation read-out system, wherein the sampling interval is set to less than 30 μm, and wherein the stimulable phosphor sheet is provided with a transparent protective layer having a thickness of at most 5 μm and a stimulable phosphor layer having a thickness falling within the range of 10 μm to 150 μm and is color with a coloring agent, and the coloring agent is a blue inorganic pigment having an average particle diameter falling within the range of 0.01 μm to 0.9 μm.

2. A radiation image read-out system as defined in claim 1 wherein the stimulating rays are a laser beam.

3. A radiation image read-out system as defined in claim 1 wherein the radiation image is an electron microscope image stored on the stimulable phosphor sheet by irradiating an electron beam, which carries image information of a sample, onto the stimulable phosphor sheet.

4. A radiation image read-out system of claim 1 further comprising:
   i) a Fourier transform means for carrying out a fast Fourier transform on an image signal which has been obtained from the radiation image read-out system to produce a Fourier transformed signal,
   ii) an extraction means for selectively extracting an image signal of a desired frequency band from the Fourier transformed signal obtained from the Fourier transform means to produce a selected signal;
   iii) an inverse Fourier transform means for carrying out an inverse Fourier transform on the selected signal extracted from the extraction means to produce an inverse transformed image signal, and
   iv) an image reproducing means for reproducing a visible image from the inverse transformed image signal, which has been obtained from the inverse Fourier transform means.

5. A radiation image read-out system for scanning a stimulable phosphor sheet, on which a radiation image has been stored, with stimulating rays, wherein said stimulating rays cause the stimulable phosphor sheet to emit light in proportion to the amount of energy stored thereon during its exposure to radiation at predetermined read-out pitches in a main scanning direction and in a sub-scanning direction to photoelectrically detect the emitted light to obtain an image representing the radiation image, said system comprising:

a sub-scanning read-out means for setting the read-out pitch in the sub-scanning direction of said stimulable phosphor sheet wherein the sub-scanning read-out pitch is set to a value within the range of approximately 20 μm to approximately 30 μm; and a read-out means for setting a read-out spot diameter of said stimulating rays, wherein the main scanning read-out spot diameter is set to a value within the range of approximately 20 μm to approximately 30 μm to read out information in the stimulable phosphor sheet; and a high speed sampling means for sampling an image signal which has been obtained from the radiation read-out system, wherein the sampling interval is set to less than 30 μm, wherein the stimulable phosphor sheet is provided with a transparent protective layer having a thickness of at most 5 μm and a stimulable phosphor layer having a thickness falling within the range of 10 μm to 150 μm and is colored with a coloring agent, and the coloring agent is a blue inorganic pigment having an average particle diameter falling within the range of 0.01 μm to 0.9 μm.

* * * * *